United States Patent [19]

Mitchell

[11] Patent Number: 4,998,375
[45] Date of Patent: Mar. 12, 1991

[54] RETRACTABLE WIRE BARB FOR FISH HOOK

[76] Inventor: Jack H. Mitchell, 80 N. Policy St., Salem, N.H. 03079

[21] Appl. No.: 467,933

[22] Filed: Jan. 23, 1990

[51] Int. Cl.⁵ ............................................. A01K 83/00
[52] U.S. Cl. ................................................... 43/43.16
[58] Field of Search ....................... 43/43.16, 42.7, 37

[56] References Cited

U.S. PATENT DOCUMENTS

| | | | |
|---|---|---|---|
| 1,333,148 | 3/1920 | Anderson | 43/43.16 |
| 2,217,928 | 10/1940 | Ward | 43/43.16 |
| 3,624,690 | 11/1971 | Ashley | 43/43.16 |
| 4,858,371 | 8/1989 | Preiser | 43/43.16 |

*Primary Examiner*—Kurt Rowan
*Attorney, Agent, or Firm*—Joseph E. Funk

[57] ABSTRACT

What is described is a hollow fish hook with a flexible, retractable wire barb made from stainless steel wire. The same wire is long enough that it passes through and external to the hollow fish hook and is used to retract the end of the wire comprising the barb so that the hook may be easily removed from the mouth of a fish. A leader wire is connected to an eye of the fish hook. Spaced apart from the fish hook and attached to the leader and to the barb retraction portion of the wire are indicator pieces. When the barb retraction end of the wire is pulled the two indicator pieces come closer to each other and touch when the wire barb is fully retracted inside of the hollow fish hook. This provides a visual indication of when the barb is fully retracted. There is also a stop element that limits how far the wire barb can protrude from the fish hook.

6 Claims, 1 Drawing Sheet

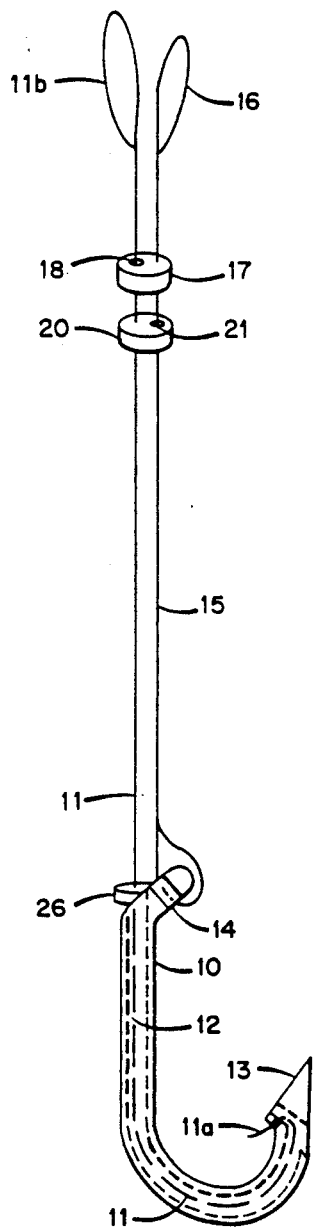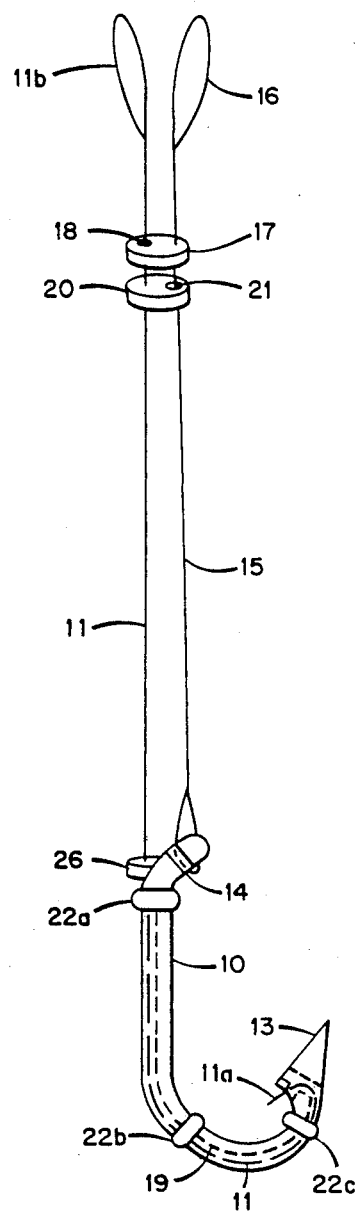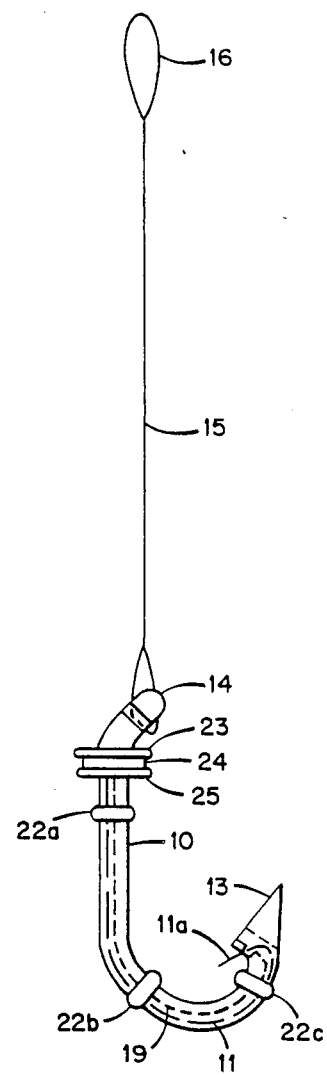

RETRACTABLE WIRE BARB FOR FISH HOOK

FIELD OF THE INVENTION

This invention relates to fish hooks in general, and more specifically to a fish hook with a wire barb that can be activated to easily release a caught fish.

BACKGROUND OF THE INVENTION

Fish hooks have barbs at their ends, the function of which is to prevent the hook from easily exiting the mouth of a fish after the fish has swallowed bait and the hook on which the bait is located. After a fish has been caught the hook has to be released from the mouth of the fish, but this is often difficult because the barb at the end of the fishhook is lodged inside the fish to prevent its removal, as is its normal function. Removal of a fish hook is easier if the barb is lodged just inside the mouth of the fish, but is difficult and sometimes impossible if the hook has been completely swallowed and is deep inside the fish. Thus, there are times that a fisherman loses their hooks and must dissect a fish to recover it.

While some fisherman catch fish to eat, other fisherman catch fish only for sport and they want to release them with little harm immediately after they are caught. Conventional fish hooks create problems in this regard. First, a fish must be taken out of the water in order to attempt removing a fish hook. This in itself shocks the fish which cannot breathe out of water, and this is compounded if there is any difficulty in removing a hook. Second, if a fish hook is caught deep inside the mouth of a fish by the barb, the hook may not be able to be removed without seriously harming or killing the fish. The only alternative is to cut the line and leave the hook caught inside the fish. This is not the best action to take if the fisherman wants to release a fish relatively unharmed.

In the prior art there are fish hooks with hinged and otherwise rotatable barbs that are moved to allow for easier removal of the fish hook from the mouth of a fish. With one prior art fish hook disclosed and claimed in U.S. Pat. No. 3,505,756 the barb is literally hinged. A fish caught with such a fish hook must be removed from the water and the fisherman must reach inside the mouth of the fish to rotate the barb to a position that permits the fish hook to be removed without causing further harm to the mouth of the fish. This is difficult and sometimes impossible if the hook is caught deep inside the mouth of the fish.

With another prior art fish hook disclosed and claimed in U.S. Pat. No. 2,217,928 the problems of the hinged fish hook are overcome. The fish hook is hollow, the barb is connected to the end of the fish hook by a relatively thin piece of metal, and there is a piece of metal wire inside the hollow fish hook and fastened to the free end of the barb. The wire extends from the end of the fish hook furthest from the barb, and when the wire is manually pulled by the fisherman the force is transmitted through the wire to the barb which is retracted to permit the hook to easily be removed from the mouth of the fish. However, if the hook is caught deep inside the mouth of the fish access to the wire is difficult and a pair of long nosed pliers are need to reach inside the mouth of the fish and grasp the wire to pull same and release the barb. With this operation the fish must be taken out of the water to remove the barb when the hook is caught deep inside the mouth of the fish. In addition, if the wire that actuates moving of the barb is pulled too far, that is the fisherman tries to pull the wire some more after the barb has been retracted as far as it can go, the wire is often broken. The result is a fishhook that has the same problems and shortcomings as fish hooks that are not designed to be easily removed from mouth of a fish without seriously harming the fish.

Thus, there is a need in the art for a fish hook with a retractable barb that cannot easily be broken, and that can actuated for easy removal of the hook from the mouth of a fish.

SUMMARY OF THE INVENTION

The foregoing needs of the prior art are met by the present invention which is a fish hook with retractable wire barb.

More particularly, my novel fish hook with retractable wire barb is a hollow hook having a piece of wire inside. The wire extends from the curved end of the hook, on which bait is placed, and comprises the barb of the fish hook. In addition, the barb may easily be retracted even if the fish hook is caught deep within the mouth of a fish. Further, a visual indication is provided to the fisherman that the barb is completely retracted so that the barb retraction mechanism is not broken, thus preventing easy removal of the fish hook from the mouth of a fish.

More particularly, my novel fish•hook with retractable wire barb is a hollow hook having a piece of hook wire inside. The hook wire has a first end that extends from the curved end of the hook and comprises the barb of the fish hook, and has a second end that is used to retract the barb. The second end of the hook wire extends well beyond the eyed end of the fish hook, opposite the barbed end, so that it is easily accessible with a caught fish remaining in the water, and even with the fish hook caught deep inside the mouth of the fish. There is a second wire attached to the eye of the fish hook and it serves as a leader. Crimped onto the barb retraction wire is a first metal piece that has a second hole through which the second wire passes unobstructed. Crimped onto the second wire/leader is a second metal piece that has a second hole through which the barb retraction wire passes unobstructed. The two metal pieces are located on the two wires away from the eye of the fish hook so that they are easily seen even when the fish hook is caught deep in the mouth of a fish. The positions of the two metal pieces on the wires are such that when the barb retraction wire is pulled to retract the barb, when the barb is fully retracted the first metal piece contacts the second metal piece. In this manner a fisherman can see when he has fully retracted the barb and does not apply any more force to the barb retraction wire to break same. Also attached to the first wire, near the eye of the fish hook, is a stop element that limits how far the first end of the first wire can extend from the curved end of the fish hook.

DESCRIPTION OF THE DRAWING

The invention will be better understood upon reading the following detailed description in conjunction with the drawing in which:

FIG. 1 is a side view of the primary embodiment of the fish hook with retractable wire barb;

FIG. 2 is a side view of a first alternative embodiment of the invention; and

FIG. 3 is a side view of second alternative embodiment of the invention.

DETAILED DESCRIPTION

In FIG. 1 is seen a side view of fish hook 10 with a retractable wire barb wire 11a per the primary embodiment of the invention. As indicated by the dotted lines hook 10 is hollow and creates a channel 12 through which a wire 11 extends. Hook 10 is preferably formed of stainless steel, and wire 11 is preferably fabricated of stainless steel piano wire. A first end of wire 11 comprises wire barb 11a and a second end of wire 11 comprises barb retraction means 11b. There is an eye formed in end 14 of fish hook 10 to which a wire leader 15 is normally fastened. The opposite end 13 of fish hook 10 is shaped as shown in FIG. 1 so that with wire barb 11a retracted inside channel 12 of hook 10 the hook can easily be removed from the mouth of a fish. The first end of wire 11 normally protrudes from curved end 13 of hook 10 and comprises wire barb 11a of fish hook 10. The shape of end 13 should be noted. It is shaped so that when wire barb 11a is retracted fish hook 10 may be easily removed from the mouth of a fish.

One end of a wire leader 15 is connected to the eye of hook 10 as shown. The other end of wire leader 15 has a loop 16 formed thereat to which a fishing line (not shown) may be attached. Wire leader 15 is several inches long. Crimped, or otherwise permanently attached, to wire leader 15 is a small first metal piece 17. Metal piece 17 has a hole 18 through which wire 11 passes and can freely move.

Wire 11 is preferably made of stainless steel wire and its first end exits channel 12 to form wire barb 11a. The other end of wire 11 extends several inches from channel 12 through hollow hook 10 and has a loop 11b formed on its end which is the wire barb retraction means. Wire 11 has a second metal piece 20 permanently attached near its wire barb retraction means 11b which is furthest away from wire barb 11a as shown. Second metal piece 20 has a hole 21 through it and through which wire leader 15 passes and can freely move.

Also fastened to wire 11 near eye 14 is a stop element 26. Element 26 touches hook 10 when wire barb 11a is extended and limits how far wire barb 11a can be extended from end 13 of fish hook 10. When barb retraction means 11b is pulled, stop element 26 is pulled away from the shank of hook 10.

In use fish hook 10 is tied to a fishing line (not shown) via loop 16 at the end of wire leader 15. Bait (not shown) is placed on hook 10. When a fish is caught wire barb 11a is hooked inside the mouth of the fish. The fisherman reels in the fish but leaves it in the water. The fisherman holds the fish under the water and pulls the wire barb retraction means which is loop 11b. Loop 11b is pulled until metal piece 20 fastened thereto travels up to metal piece 17 crimped to wire leader 15. The pulling force is transmitted through wire 11 which passes through channel 12 to retract wire barb 11a. When metal pieces 17 and 20 touch the fisherman has a visual indication that wire barb 11a is fully retracted and does not pull any harder, thus preventing breaking wire 11 by excessive pulling force. Hook 10 may then be easily removed from the mouth of the fish. Afterwards, wire 11 is pushed back through hook 10 toward end 13 to re-extend wire barb 11a. The stainless steel piano wire from which wire 11 is made is stiff enough that this is no problem.

In FIG. 2 is seen a side view of a first alternative embodiment of the novel fish hook 10 with retractable wire barb 11a. In this alternative embodiment hook 10 is not hollow but, rather, has a groove 19 along most of its length on the outside as shown. Wire 11 lies in groove 19. Wire 11 is held in groove 19 by clips 22a, 22b and 22c which also limit the travel of wire 11 under the clips to thereby prevent wire 11 from coming out of groove 19. The operation of the barb retraction mechanism is the same as described in previous paragraphs.

A second alternative embodiment of the invention is shown in FIG. 3. Located at the eyed end 14 of fish hook 10, adjacent to the eye, there is a small diameter stainless steel metal washer 23 through the central hole of which the shank of fish hook 10 passes. Washer 10 is permanently fastened to the shank of fish hook 10. On the side of metal washer 23 furthest away from the eye of hook 10 is a small diameter rubber washer 24 through the central hole of which the shank of fish hook 10 also passes. Metal washer 23 is bonded to the rubber washer 24 by an adhesive (not shown). Adjacent to rubber washer 24, on the side furthest away from the eye, is a second, small diameter, stainless steel metal washer 25 through the central hole of which the shank of fish hook 10 also passes. Metal washer 25 is bonded to the rubber washer 24 by an adhesive (not shown). Neither washers 24 or 25 are fastened to the shank of fish hook 10. End 26 of wire 11 exits channel 12 near metal washer 25 and is spot welded to washer 25 as shown in FIG. 3.

To retract wire barb 11a, which is the first end of wire 11 protruding from the curved end 13 of fish hook 10, metal washers 23 and 25 are squeezed together compressing rubber washer 24. This pulls wire 11 and causes wire barb 11a to be retracted inside channel 12 through fish hook 10 so that it does not extend beyond the curved end 13 of fish hook 10. When the pressure squeezing washers 23 and 25 together is released, rubber washer 24 expands and pushes wire barb 11a outside of end 13 of fish hook 10.

While what has been described hereinabove is the preferred embodiment of the invention and one alternative embodiment, it will be recognized by those skilled in the art that many changes may be made without departing from the spirit and scope of the invention. For example, metal pieces need not be attached to the metal wires. Instead, other indication means may be placed on the wires to indicate the amount of travel of the barb retraction wire.

What is claimed is:

1. A fish hook for use with a fishing line, said fish hook comprising:
   a curved, elongated member having a first end and a second end;
   a wire that passes from said first end to said second end of said elongated member, said wire having a first end that extends beyond first end of said elongated member to provide a barb to said fish hook, and said wire having a second end that extends beyond said second end of said elongated member and force is applied to said second end of said wire to displace said wire a small distance so that said first end of said wire does not extend beyond said first end of said elongated member to thereby retract said barb;
   a leader attached to said elongated member at said second end, said leader being used to attach said hook to said fishing line;

a first indicator element attached to said leader and having a first hole through it through which said wire passes and moves freely; and a second indicator element attached to said wire and having a second hole through it through which said leader passes and moves freely, and as force is applied to said wire to retract said barb end of said wire said second indicator element moves toward said first indicator element, and when they touch it provides a visual indication that said barb is fully retracted.

2. The invention in accordance with claim 1 further comprising barb retraction means attached to said second end of said wire for applying force to said wire to retract said barb.

3. The invention in accordance with claim 2 further comprising stop means attached to said wire external to said fish hook for limiting how far said first end of said wire extends beyond first end of said elongated member to provide a barb.

4. The invention in accordance with claim 3 wherein said curved, elongated member has a groove along its outer side in which said wire lies, and further comprising a clip means attached to said elongated member to hold said wire in said groove.

5. A fish hook for use with a fishing line, said fish hook comprising:

a curved, elongated member having a first end and a second end;

a wire that passes from said first end to said second end; said wire having a first end that extends beyond first end of said elongated member to provide a barb to said fish hook, and said wire having a second end, and force is applied to said second end of said wire to displace said wire a small distance so that said first end of said wire does not extend beyond said first end of said elongated member to thereby retract said barb;

a first rigid element through which said elongated member passes, said first element being attached to said elongated member near the second end thereof;

an elastic element through which said elongated member passes, said elastic element being adjacent to said first element on the side nearest said first end of said elongated member;

a second rigid element through which said elongated member passes, said first element being adjacent to said elastic element on the side nearest said first end of said elongated member, said second element being movable along said elongated member, and the second end of said wire is attached to said second element;

and to retract said wire barb said second element is forced toward said first element, compressing said elastic element, to thereby apply force to said wire to move it in a first direction to retract said wire barb, and when said force is removed said elastic element returns to its original shape pushing said wire in a second direction opposite said first direction and thereby extending said first end of said wire beyond said first end of said elongated member to form said barb.

6. The invention in accordance with claim 5 wherein said elongated member has a groove along its outer side in which said wire lies and further comprising a clip means attached to said elongated member to hold said barb retraction wire in said groove.

* * * * *